Oct. 30, 1962     L. PÉRAS     3,060,864
AUTOMATICALLY-CONTROLLED FEED DEVICE FOR MACHINES
Filed Jan. 29, 1957

Oct. 30, 1962      L. PÉRAS      3,060,864
AUTOMATICALLY-CONTROLLED FEED DEVICE FOR MACHINES
Filed Jan. 29, 1957      5 Sheets-Sheet 2
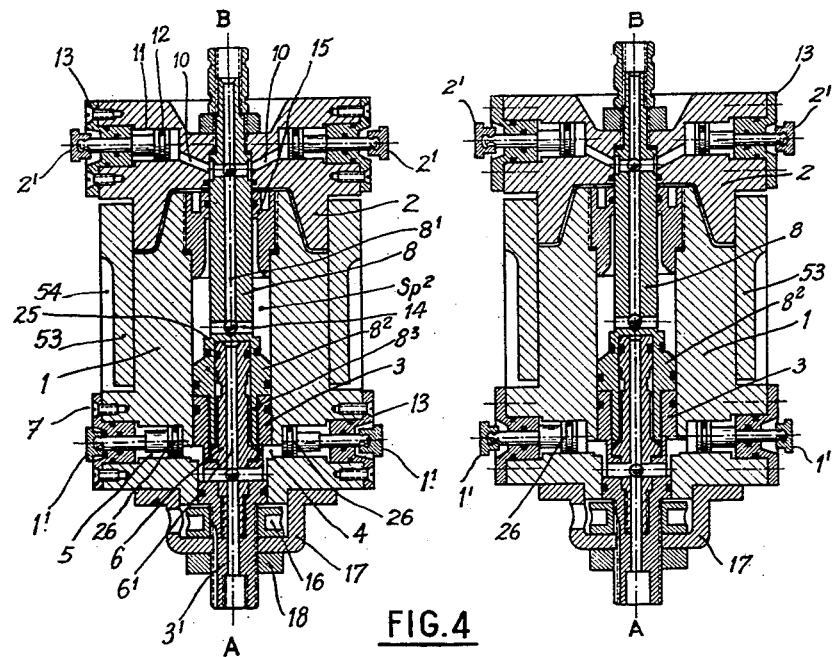
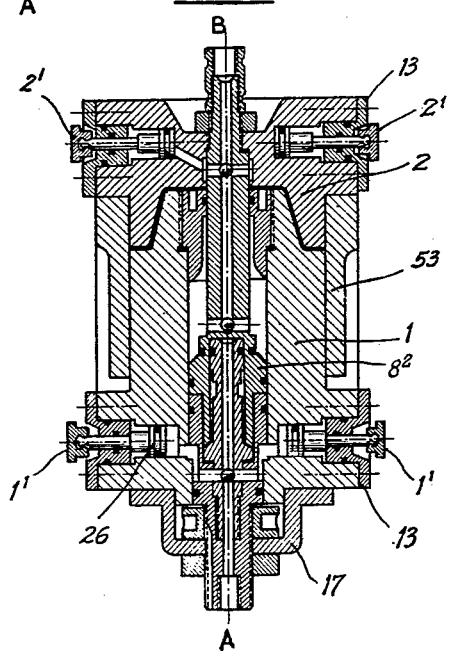

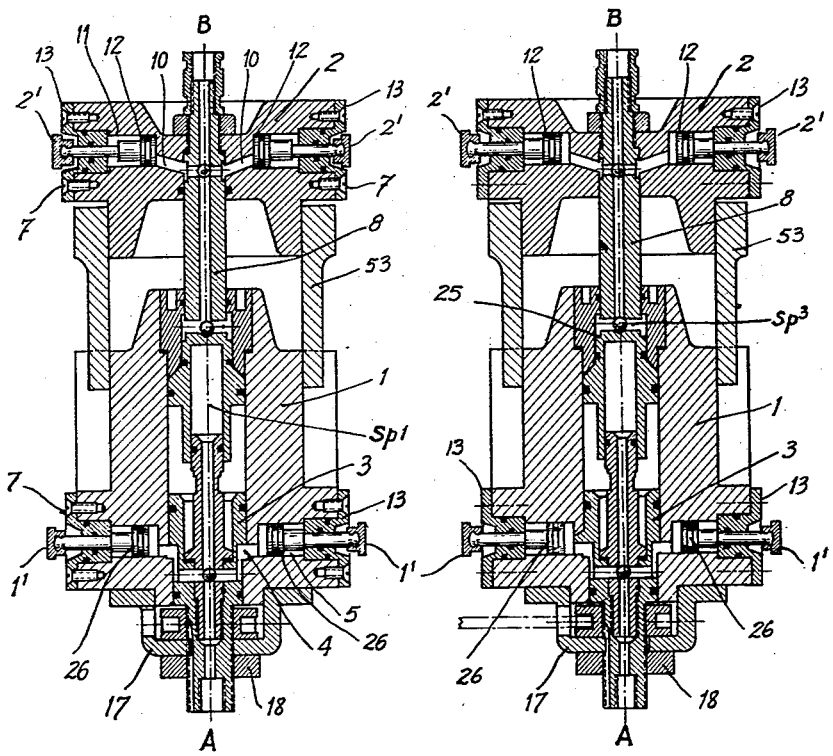
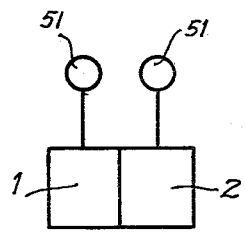
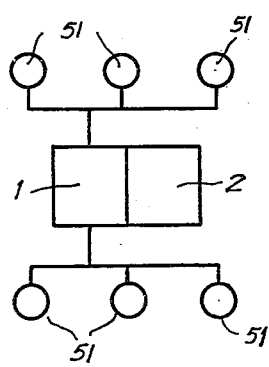
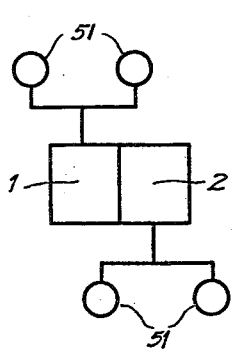

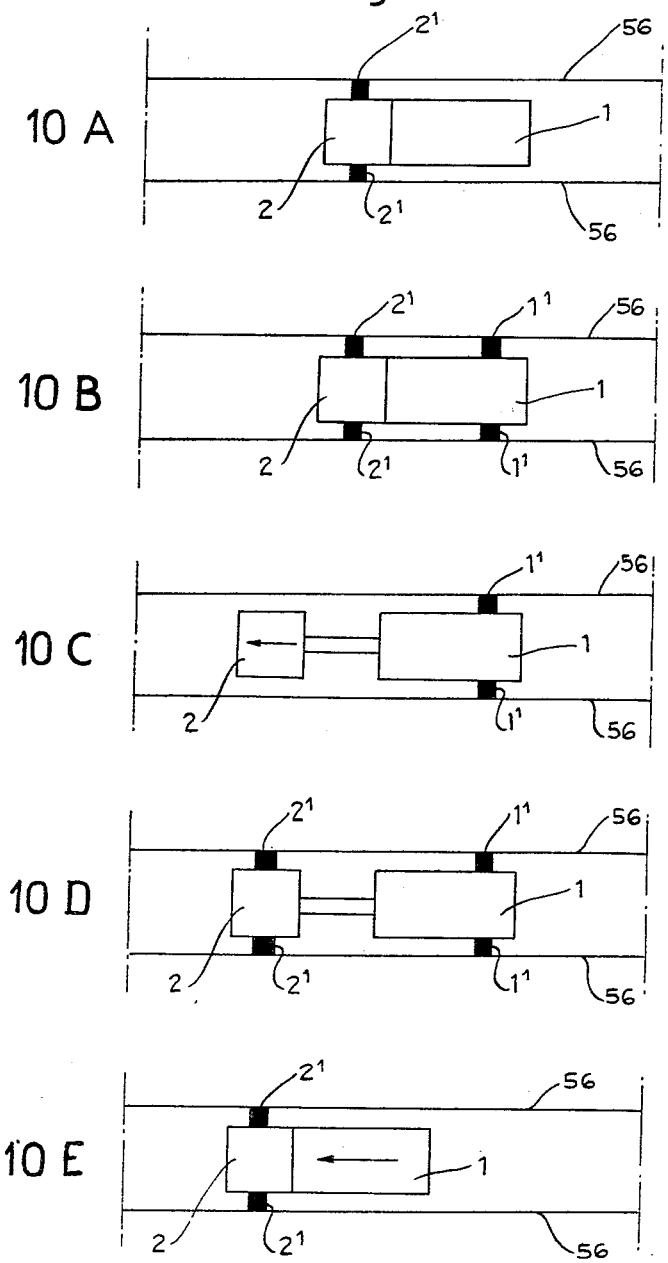

Oct. 30, 1962 L. PÉRAS 3,060,864
AUTOMATICALLY-CONTROLLED FEED DEVICE FOR MACHINES
Filed Jan. 29, 1957 5 Sheets-Sheet 5
Fig_11
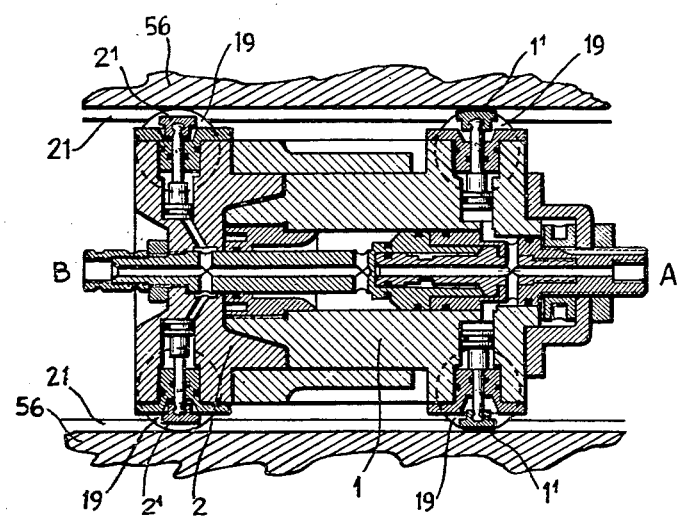
INVENTOR
LUCIEN PÉRAS
BY
ATTORNEY United States Patent Office 3,060,864
Patented Oct. 30, 1962

3,060,864
AUTOMATICALLY-CONTROLLED FEED DEVICE FOR MACHINES
Lucien Péras, Billancourt, France, assignor to Regie Nationale des Usines Renault, Billancourt, France, a French works
Filed Jan. 29, 1957, Ser. No. 636,994
Claims priority, application France Feb. 4, 1956
3 Claims. (Cl. 104—121)

The invention relates to an automatically controlled intermittent feed device for machines which can be used with advantage for the automatic feeding of some tools during their operation. The invention relates more particularly to an embodiment of the automatic feed device which is particularly suited to the gun welders used in the manufacture of metal motor-vehicle bodywork.

Conventionally, the portable spot welding guns used for welding sheet metal, more particularly for welding motor-vehicle bodywork assemblies, are moved manually by the operator along the sheets to be welded, the movement being performed in the interval of the welding spots, the welding rhythm being determined by an electronic device which operates a hydro-pneumatic booster controlling the opening and closure of the guns and the flow of current therethrough.

If the feed device according to the invention is used, the manual movements of the welding gun can be replaced by automatic movements produced by a device mainly formed by two blocks suitably guided along the work to be performed, that is, the welding line in this case. The two blocks, one of which is, for instance, integral with the tool, can move relatively to one another within predetermined limits and are subjected to the action of pressure fluids suitably distributed to each block so that, if one block is retarded on its guide, the other can remain stationary or be displaced in accordance with an appropriate cycle, thus enabling the tool to be "inched" along. The invention also relates to some constructional details which will be described more particularly hereinafter.

The accompanying drawings illustrate a device having two blocks according to the invention as used to control the automatic feeding of a welding gun given merely by way of non-limitative example.

In the drawings:

FIGURES 2 to 6 illustrate, in sectional views taken along a plane extending through their lengthwise axis 55—55 parallel to the rails 21, the automatic feed block in various positions during operation;

Figure 1:
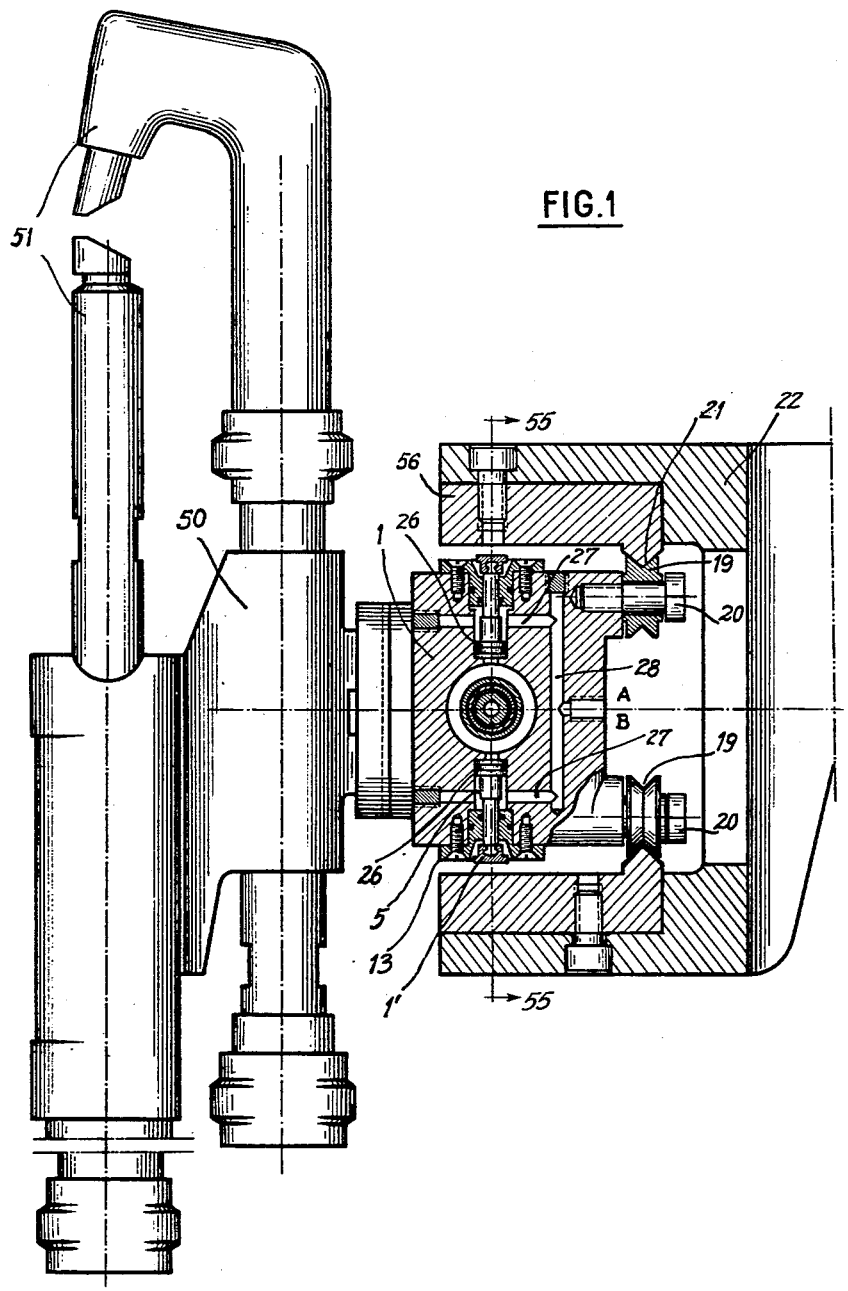
FIGURE 1 shows the gun-bearing blocks fitted to their track.

FIGURES 7 to 9 diagrammatically illustrate examples of machines for producing multiple welding spots with the automatic feed device according to the invention;

FIGURE 10 is a diagrammatic view of the device of the invention showing relationships in various phases of the operation, and consisting of FIGS. 10A, 10B, 10C, 10D, and 10E; and FIGURE 11 is a detailed axial cross-sectional view of the device.

Referring to the drawings, and more particularly FIG. 1, one of the blocks 1, seen in cross-section, is so secured to the frame 50 of the welding gun 51 that the movements of the block are identical with the movements of the welding gun 51.

As can be seen in FIGS. 2 to 6, the feed device consists of an assembly of two blocks 1 and 2 which can be moved or rigidly secured relatively to one another by hydraulic pressure. The two blocks 1 and 2 are nested one in another and can slide one on top of another by being guided by lugs 53 of the block 2, the lugs 53 moving in grooves 54 in the block 1.

The block 1 is pierced with an axial channel, to the bottom of which is secured a sleeve 3. Secured to the end thereof is a tube $3^1$ which communicates, through a flexible tube (not shown), with a high-pressure hydraulic device A for subjecting the block to pressure in a manner to be described hereinafter. Secured in the sleeve 3 is a piston 6 likewise pierced with a central channel $6'$ through which pressure can be applied between the top surface of the piston 6 and the recess inside a differential piston 8 defining a first chamber $Sp^1$ which will be described hereinafter (FIG. 5).

In the block 1, two side ducts 4 connect the tube $3^1$ to two cylinders 5 in which slide two differential push-rods 26 also guided in flanges 7. Two jaws $1'$ are fitted to the ends of the push-rods 26. The cylinders 5 communicate laterally, by way of ducts 27, with a duct 28 connected to a second booster B acting upon the block 2 (FIG. 1).

The differential piston 8 pierced with a central duct $8^1$ is secured to the block 2, and secured to the end of the piston 8 is a flexible tube (not shown) connected to the second booster B and enabling pressure to be applied to the block 2.

In the block 2 two lateral ducts 10 connected to the channel or duct $8^1$ communicate with two cylinders 11 in which slide two differential push-rods 12 guided in flanges 13. Two jaws $2'$ are secured to the ends of the push-rods 12. The cylinders 11 communicate with the high-pressure device A by way of ducts (not shown) similar to the ducts 27, 28.

The differential piston 8 is stepped and is rigidly secured to the block 2. The piston 8 so slides in the largest-diameter axial duct of the block 1 as to form a second pressure chamber $Sp^2$ which is annular and has surfaces (see FIG. 2) in which the pressure of the booster B can reach by way of two lateral orifices 14 pierced in the piston 8 and connected to the duct $8^1$. The piston 8 can move between a stop 15 integral with the block 1 and the sleeve 32 secured thereto. This travel of the piston 8 determines the interval of the welding spots and can be varied by adjusting the sleeve 3 on the block 1 by means of a nut 16 which screws on to the extension of the sleeve 3 and bears against a flange 17 with a locknut 18.

The base of the piston 8 which serves as a stop on the sleeve 3 is extended by a cylindrical part $8^3$ which is placed in the sleeve 3 and in which is contrived the recess for the piston 6 already described. The base $8^2$ of the piston 8 is conical at the top and can engage with the conical base of the stop 15.

The piston 8 of the block 2 has a third step 25 which is exactly centered in a bore in the stop 15 determining a third annular chamber $Sp^3$ which the pressure from the booster B reaches (see FIG. 6) by way of the inside of the piston 8.

The bearing surfaces of the three chambers $Sp^1$, $Sp^2$, $Sp^3$ are such that $$Sp^2 > Sp^1 > Sp^3$$

A number of sealing-tight packings are disposed on the various parts of the device to obviate leakage of pressure liquid. The push-rods 26 and 12 form differential pistons and the high-pressure devices A and B act separately or simultaneously in such manner that the two push-rods 26 and their jaws $1'$ are actuated on their large surface by the booster A and on their small surface by the booster B, the small surface being the opposite, outer side of each push-rod 26, smaller by the area of the piston rod. Similarly, the large surfaces of the push-rods 12 and jaws $2'$ are actuated by the booster B and the small surfaces by the booster A. Each of the blocks 1 and 2 bears rollers 19 which are maintained by screws 20 on the respective blocks and which engage with rails 21 secured by means of flat elements 56 with which they are integral in a frame 22 (FIG. 1).

The operation of the automatic tool-feeding device extends over a number of cycles.

In the first cycle, the welding gun is open (FIG. 2).

The hydraulic pressure of the booster B is distributed to the cylinders 11 of the block 2 through the ducts 10. The push-rods 12 and jaws 2' are urged outwards and applied to the flat elements 56, thus immobilizing the block 2 on the frame 22. The block 1 is not subjected to pressure by the booster A and the pressure from B is applied to the differential annular parts of the push-rods 26, while the jaws 1' are not in engagement with the flat elements 56.

Pressure from the booster B is also applied, through the duct $8^1$ of the piston 8, to the surface of the chamber $Sp^2$, with the result that the base $8^2$ of the piston 8 secured to the block 2 is moved away from the stop 15 secured to the block 1 and the blocks 1 and 2 are rigidly secured to one another in nested relationship.

In the second cycle, the welding gun is closed (FIG. 3).

The hydraulic pressure from the booster B remains operative, the jaws 2' still bear against the flat elements 56 and the chamber $Sp^2$ is still subject to the pressure of the booster B.

The booster A is then brought into operation. As a result, the block 1 is subjected to a pressure supplied by way of the sleeve 3 and ducts 4 to the cylinders 5 and so to the differential push-rods 26 and the jaws 1'. Two forces act upon the push-rods 26, the pressure applied to the block 1 from the booster A acts upon the large surfaces 5, while the pressure supplied to the block 2 from the booster B acts upon the smaller differential annular surfaces, with the result that the push-rods 26 are urged outwards and lock the block 1 against the flat elements 56 and frame 22.

Also, the pressure associated with the block 2, from the booster B, acts, by way of the central duct in the piston 6, upon the chamber $Sp^1$, but since the bearing surface of $Sp^2$ is greater than that of $Sp^1$, the two blocks 1 and 2 remain rigidly secured to one another or close together.

In the third cycle the welding gun is still closed (FIGS. 4 and 5).

The block 1 is still supplied with hydraulic pressure from the booster A and remains locked to the flat elements 56 of the frame 22.

The pressure from the booster B is cut off, the jaws 2' are now subject only to the pressure applied to their differential annular surfaces by the booster A and are urged into the block 2 which therefore ceases to be locked to the flat elements 56 (FIG. 4).

Also, pressure ceases to be applied to the chamber $Sp^2$. Only the chamber $Sp^1$ receives from the booster A a pressure which acts upon the inside of the piston 8 in the chamber $Sp^1$ and thus moves the piston 8 and therefore the block 2 which is unlocked (FIG. 5).

The latter, therefore, performs its movement while the welding gun, still in engagement, terminates the welding operation.

In the fourth cycle, the gun is closed (FIG. 6).

Pressure from the booster A is still applied to the block 1 which remains locked. The booster B is brought into operation again and the resultant pressure acts upon the block 2. The push-rods 12 are subjected to the two pressures from A and B, and since the pressure from B acts upon the larger surface of the push-rods 12, the same move so that the jaws 2' locking the block 2 are urged outwards.

The blocks 1, 2 are still separated from one another and so the pressure from B does not act upon the chamber $Sp^2$, while since the packings and the piston 8 are resting upon the conical part of the stop 15, no pressure fluid can flow into the chamber $Sp^2$ from B. Pressure from B can act only in the annular chamber $Sp^3$ produced by the bore in the stop 15 and by the first step 25 of the piston 8. The blocks 1 and 2 are subjected to the action of the pressures from A and B upon the chambers $Sp^1$ and $Sp^3$; since $Sp^1$ is greater than $Sp^3$, there is no displacement.

If pressure continues to be applied from the booster B and the pressure of booster A is cut off, there is a return to the conditions of the first cycle. The block 2 then remains locked. The pressure from the booster A being cut off and ceases to act upon the chamber $Sp^1$, the push-rods 26 of the jaws 1' are subjected only to the pressure from B and are therefore unlocked, while the pressure from B acts in the chamber $Sp^3$ upon the step 25 of the piston 8, thus urging the block 1 towards the block 2 so that the two blocks become rigidly secured to one another (FIG. 2). The four cycles have terminated and a second spot weld can now be performed, and so on.

Referring to FIG. 10, wherein FIG. 10A corresponds to FIG. 2, FIG. 10B corresponds to FIG. 3, FIG. 10C corresponds to FIGS. 4 and 5, FIG. 10D corresponds to FIG. 6 and FIG. 10E shows return to the position of FIG. 2. The operations taking place during the cycles of operation are indicated below.

FIG. 10A (FIG. 2)

Pressure is applied from B and block 2 is locked.
Pressure in $Sp^2$ applies block 1 against block 2.

FIG. 10B (FIG. 3)

Pressure is applied through A. Block 1 is locked.
Pressure is applied through B. Locking of block 2 is maintained.
Pressure is applied in $Sp'$ and $Sp^2$.
Since the surface $Sp^2 > Sp'$, the force developed in $Sp^1$ and block 1 continues to be applied against block 2.

FIG. 10C (FIGS. 4 and 5)

Pressure is applied from A. Locking of block 1 is maintained and block 2 is unlocked.
Pressure in $Sp'$ separates block 2 from block 1.

FIG. 10D (FIG. 6)

Pressure is applied through A. Locking of block 1 is maintained.
Pressure is applied through B. Block 2 is locked.
Since the surface of $Sp' > Sp^3$, block 2 continues to be maintained separated from block 1.

FIG. 10E (FIG. 2)

Pressure is applied through B. Locking of block 2 is maintained. Block 1 is unlocked.
The pressure in $Sp^3$, then in $Sp^2$ applies the block 1 against the block 2 as in FIG. 2 and Sketch I.

FIG. 11 has the block 56 drawn in relationship to the assembly shown in FIG. 4.

In the embodiment hereinbefore described, a single welding station coupled with one of the automatic feed blocks is provided.

Of course, two or more welding stations rigidly coupled with either or both blocks of the system described could be so disposed that the movements of such stations are identical, an automatic feed multiple spot welding machine thus being produced.

The diagrammatic sketches in FIGS. 7, 8 and 9, given by way of non-limitative examples, show multi-point welding stations 51 borne by the blocks 1 and 2.

The automatic feed device according to the invention can be applied to all machines which move along the workpieces in such manner that the movements occur in the same direction, are consecutive and are identical.

Such a device could be used, for instance, on a stamping machine or a slotting machine or a boring machine which move along in order to pierce equally separated holes or to contrive slots.

Similarly, such a device could be used with advantage on a printing press moving along a fabric or paper to deposit prints.

The application of such a device is not limited to the foregoing examples. All that is necessary is that the device in question move along a predetermined track on any kind of slideway, the said device moving under its own power and automatically by means of hydraulic power supplied by two hydropneumatic boosters, the rhythms of movement being determined by apparatus which is preferably electronic but which can be of any desired kind, for instance, a clockwork or any other movement.

I claim:

1. An automatically-controlled discontinuous feed device for spot welding, drilling, slotting and like repeating processes and comprising, in combination, two blocks, one of which at least being tool-bearing, and a track having an engageable surface and integral rails extending along the work to be acted upon, said blocks being coupled by first pressure-actuated sliding means to form an assembly guided along said track surface by said rails of said track, each of said blocks of said assembly being adapted to be moved selectively by said first pressure-actuated means towards and away from one another within predetermined limits relatively to the other of said blocks, each of said blocks being provided with second pressure-actuated means selectively movable into and out of engagement with said surface for selectively locking and unlocking each block to said track surface, said blocks being provided with conduits for selective admission of fluid to said first pressure-actuated means and to said second pressure actuated means, whereby one of said blocks is movable along said track while not locked thereto and while the other of said blocks is locked to said track surface.

2. An automatically-controlled unidirectional feed device as defined in claim 1, wherein said first fluid-actuated means comprise differential push-rods having a large surface adapted to be subjected to the pressure from the pressure fluid supplied to one block and having an annular surface adapted to be subjected to the pressure from the pressure fluid supplied to the other block, and wherein said second fluid-actuated means comprise pistons carrying shoes adapted to engage said surface.

3. An automatically-controlled unidirectional feed device as defined in claim 2, wherein one of said blocks has a hollow recess and has a sleeve portion adapted to engage the other block to receive said block in said recess, said first-named block having an axially-extending stepped piston unit formed with an axial bore communicating with the conduit for supplying fluid under pressure to said block, and communicating with the push-rods in said block, the other of said blocks being formed with an axial bore dimensioned to receive the piston unit of the first-named block and itself having an axial piston unit formed with an axial bore communicating with the conduit for supplying fluid under pressure to said other block and with the push-rods in said other block, said blocks being formed with means defining pressure chambers adapted for selective reception of said fluid under pressure for moving said blocks selectively toward and away from each other in response to the flow of said fluid under pressure.

References Cited in the file of this patent
UNITED STATES PATENTS

| | | |
|---|---|---|
| 1,986,413 | Rumelin | Jan. 1, 1935 |
| 2,018,087 | Plass | Oct. 22, 1935 |
| 2,099,776 | Svenson | Nov. 23, 1937 |
| 2,246,502 | Bramsen et al. | June 24, 1941 |
| 2,412,598 | Brush | Dec. 17, 1946 |
| 2,481,421 | Hayes | Sept. 6, 1949 |
| 2,563,627 | Stone | Aug. 7, 1951 |
| 2,723,582 | Salome et al. | Nov. 15, 1955 |